Figure 1:
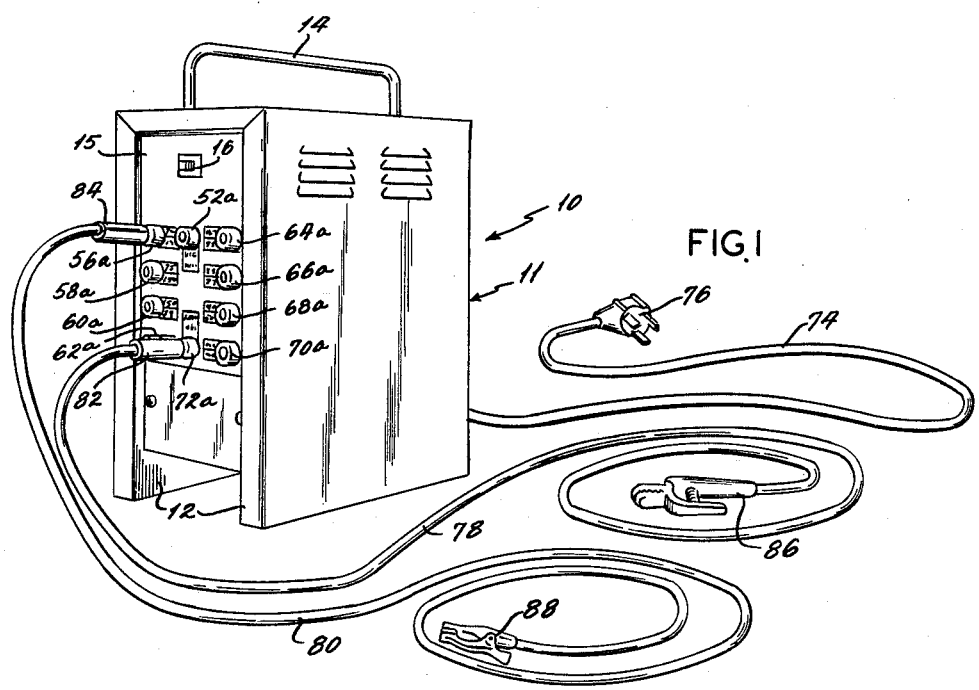

Nov. 19, 1963  E. A. KAMP ETAL  3,111,618
ELECTRIC CONTROL DEVICE FOR WELDING INSTRUMENTS
Filed March 5, 1959  3 Sheets-Sheet 1

INVENTORS:
EARL A. KAMP
HARRY E. MOORE

By Gravely, Lieder & Woodruff
ATTORNEYS.

INVENTORS:
EARL A. KAMP
HARRY E. MOORE

By Gravely, Lider & Woodruff
ATTORNEYS.

INVENTORS:
EARL A. KAMP
HARRY E. MOORE

By Gravely, Lieder & Woodruff
ATTORNEYS.

United States Patent Office 3,111,618
Patented Nov. 19, 1963

3,111,618
ELECTRIC CONTROL DEVICE FOR WELDING INSTRUMENTS
Earl A. Kamp, 119 S. Hope St., Jackson, Mo., and Harry E. Moore, Rte. 1, Oak Ridge, Mo.
Filed Mar. 5, 1959, Ser. No. 797,402
3 Claims. (Cl. 323—50)

The present invention relates generally to electric control devices and more particularly to a novel control device for electric welding instruments and the like.

Various attempts have been made in the past to construct an inexpensive control device, such as a control device for electric welding equipment, which is capable of efficient operation on a plurality of different selected operating conditions. All of the known devices, however, are relatively complicated and expensive to construct, are relatively inefficient to operate, and require a large number of parts.

The present device overcomes these and other disadvantages of the known devices by providing a simplified electric control device having a minimum number of parts, principal of which is a single closed core element having transformer means mounted on one portion thereof and reactor means mounted on another portion thereof, said transformer and reactor means having some mutual magnetic coupling therebetween and are adapted to be connected between a source of electric energy and a welding instrument, said reactor means having a plurality of connector positions any one of which can be connected to a controlled instrument such as a welding instrument depending upon the welding current and voltage requirements.

It is a principal object of the present invention to provide a control device for welding instruments and the like of simple and relatively inexpensive construction.

Another object is to control the current and voltage characteristics of a welder and to provide a wide selection of welding current outputs.

Another object is to increase the versatility and simplify the operation of welding devices.

Another object is to improve the power factor and efficiency of electrical equipment such as electric welding equipment.

Another object is to reduce the size and weight of welding equipment.

Still another object is to provide compact and relatively lightweight portable welding equipment.

These and other objects and advantages of the present invention will become apparent after considering the following description in conjunction with the accompanying drawings.

Figure 3:
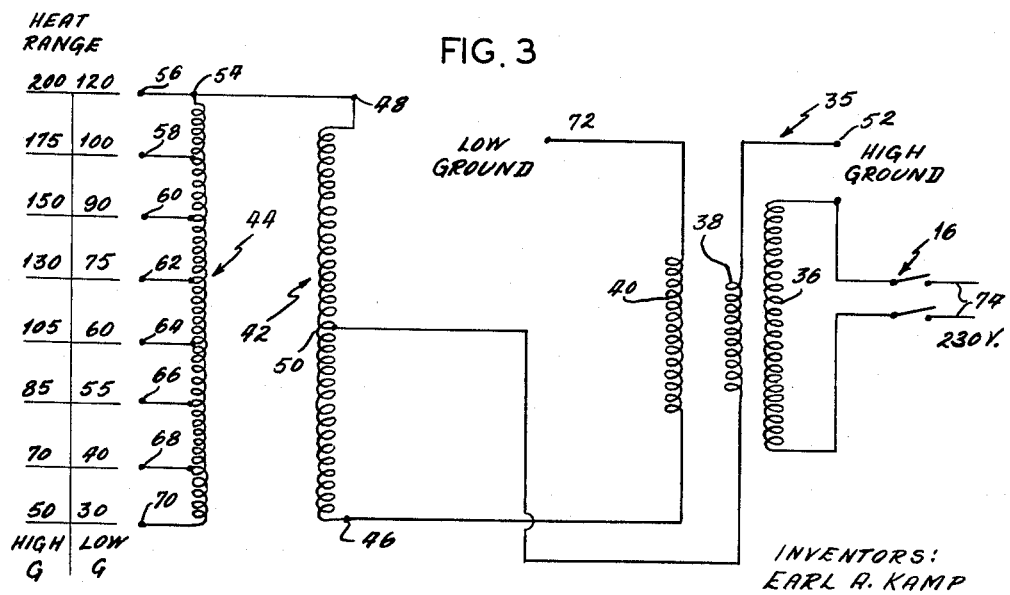
Figure 2:
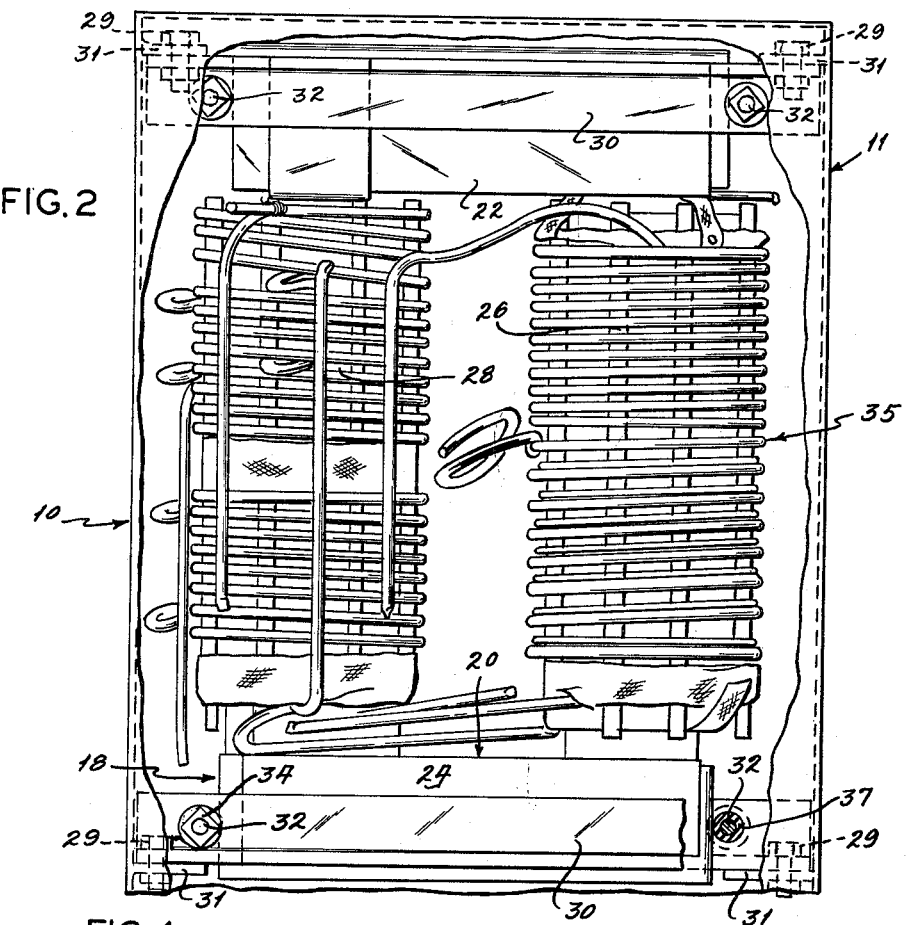
Figure 4:
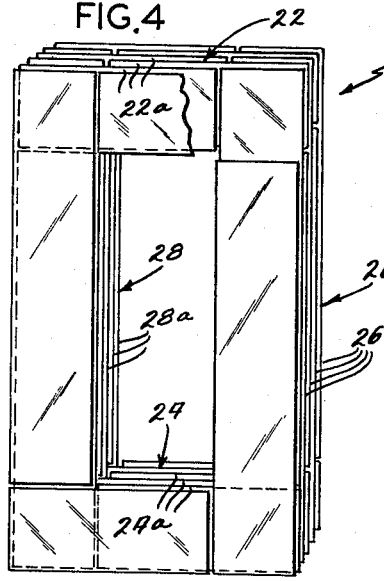
Figure 7:
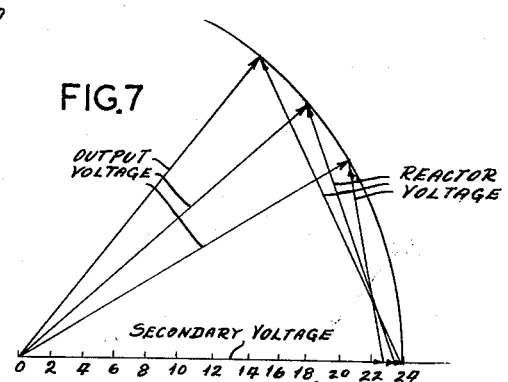
Figure 5:
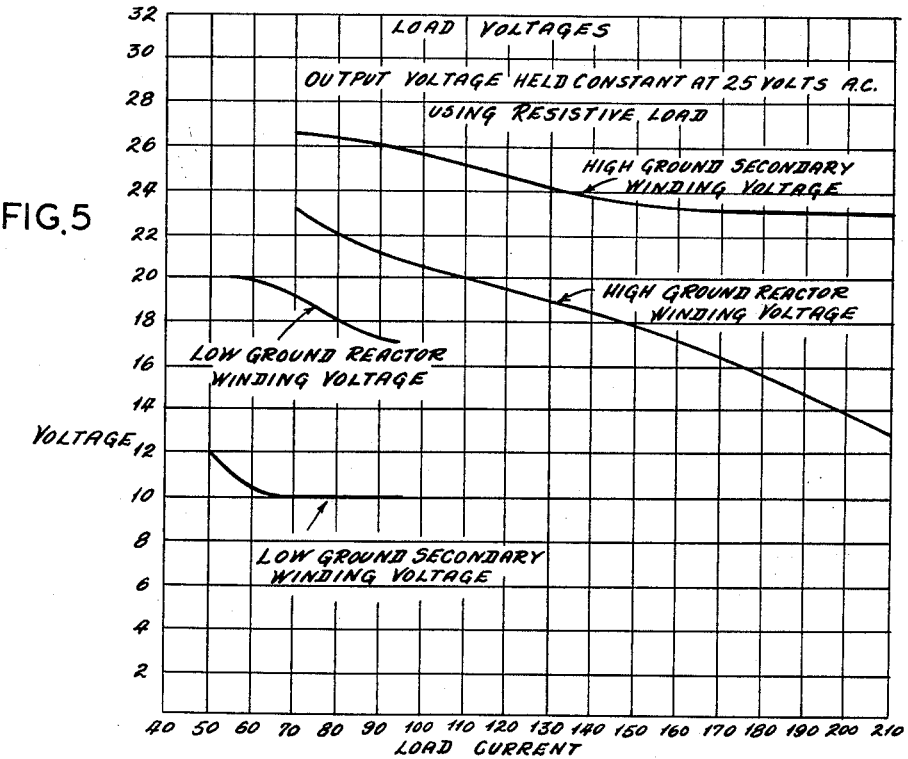
Figure 6:
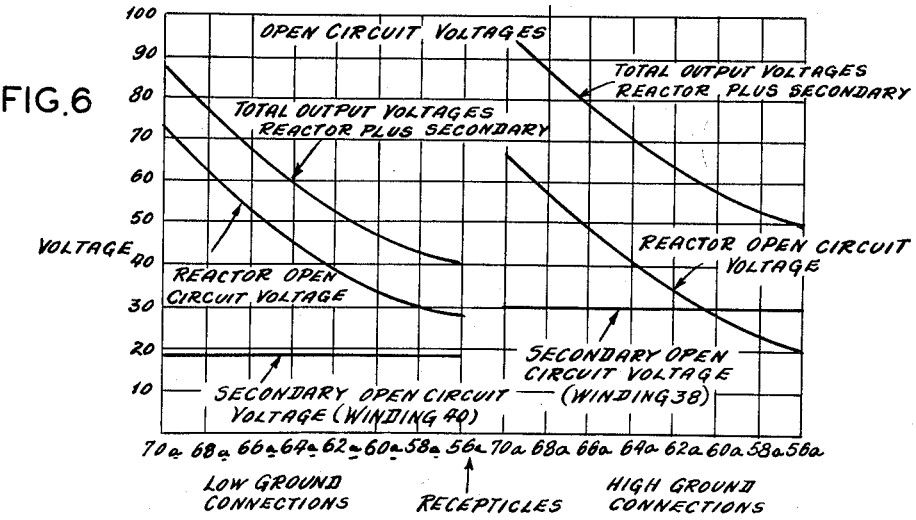

In the drawings:

FIG. 1 is a perspective view of a control device constructed according to the teachings of the present invention, FIG. 2 is a side elevational view of the device, the side wall thereof being partly cut away to show the interior mechanism, FIG. 3 is a schematic diagram of the circuit employed in the present device, FIG. 4 is a perspective view of the core per se employed in the present device, FIG. 5 is a graph of secondary circuit voltages plotted against load current, FIG. 6 is a graph of the secondary circuit voltages under open circuit conditions, and FIG. 7 is a vector diagram of the secondary circuit voltages under different load conditions and with constant output voltage.

Referring to the drawings more particularly by reference numbers, the number 10 in FIG. 1 refers generally to a control device constructed according to the present invention. The device 10 has a housing 11 with spaced leg portions 12, a handle 14, and a control panel 15 with an on-off switch 16 located near the top, and a plurality of female plug receptacles positioned therebelow. The receptacles will be described more in detail hereinafter.

A core element 18 is positioned inside the housing 11 as shown in FIG. 2. The core element 18 has a laminated core 20 (FIGS. 2 and 4) constructed with spaced upper and lower horizontal leg portions 22 and 24 and spaced connected vertical leg portions 26 and 28. The construction of the core 18 is shown in FIG. 4 with the core laminations arranged in staggered relation to minimize core losses and also to prevent overheating of the device. The core 18 is mounted inside the housing 11 between spaced non-magnetizable angle support members 30 which are insulated from and clamped to the upper and lower leg portions 22 and 24 by bolts 32 and nuts 34. The bolts 32 and nuts 34 are further insulated from the supports 30 by insulators 37. The ends of the supports 30 are notched to receive mounting bolts 29 which fasten the supports 30 to fixed shelves 31 in the housing 11.

In the embodiment shown in the drawings, the right leg portion 26 of the core 18 (FIG. 2) carries a transformer 35 which is shown in FIG. 3 having three windings. Winding 36 (FIG. 3) is the primary winding of the transformer and is connected to an alternating current source of energy through the on-off switch 16.

Windings 38 and 40 are the secondary transformer windings and are magnetically coupled to the primary winding 36 and either secondary winding can be selected for use depending upon the amount of welding current required. When welding with the present device, it is usually necessary to have relatively large secondary currents and relatively small secondary voltages. For this reason the secondary transformer windings 38 and 40 are constructed having fewer turns than the primary winding 36. This means that the primary voltage, or source voltage, is stepped down in the secondary with a resulting increase in secondary or welding current. For example, if a 230 volt alternating current source is connected across the primary winding 36 and the primary winding has 230 turns, and if the secondary winding 38 has only 26 turns the secondary voltage will be about 25 volts assuming a normal circuit loss of about 1 volt. Secondary winding 40 also has fewer turns than the primary winding 36 but has a different number of turns than the secondary winding 38 in order that it will cover a different range of welding currents.

The leg 28 of the core 20 has two reactor windings 42 and 44 mounted thereon. The windings 42 and 44 are provided primarily because of their reactance or impedance characteristics and are included primarily to provide the desired welding current increments. For example, the more reactance turns that are connected in series in the secondary circuit, the smaller will be the welding current, and vice versa. The winding 42 is shown having three connections, one at each end thereof numbered 46 and 48, and another at an intermediate position numbered 50.

One side of the secondary winding 38 is connected to the intermediate position 50 on the reactor winding 42, and the opposite side of the secondary winding 38 is connected to a terminal 52 and to receptacle 52a on the control panel 15. The connection 48 on the reactor winding 42 is connected to one end connection 54 of the reactor winding 44. The reactor winding 44 has a plurality of connector positions identified by numbers 56, 58, 60, 62, 64, 66, 68 and 70, and these connector positions are connected to corresponding receptacles on the control panel 15, said receptacles being identified in FIG. 1 by the same numbers as their corresponding connector positions followed by suffix *a*. Any one of these receptacles can be selected for use depending upon the amount of welding current required. For example, if a relatively large welding current is needed, a connector near the upper end of the reactor 44 is made in order to connect a relatively small amount of the total reactance in the secondary circuit. Conversely if a small welding current is needed a connector near the lower end of reactor 44 is selected. The circuit when using the secondary winding 38 is completed by connecting the input leads 78 and 80 of a welding instrument, such as an arc welding instrument (not shown), between the high ground terminal 52 which corresponds to receptacle 52a on the control panel 15, and the desired one of the receptacles 56a–70a on the control panel. Selection of the secondary winding 38 enables the operator to choose in this manner any of a plurality of welding currents within the range of currents available therefrom. In the embodiment shown, the secondary winding 38 has fewer turns than the secondary winding 40, and therefore the winding 38 covers a relatively higher range of welding currents than the secondary winding 40.

The secondary winding 40 has one side thereof connected to the connector 46 on the reactor winding 42 and the other side connected to connection 72 and receptacles 72a on the control panel 15. When the secondary winding 40 is selected for use, the welding circuit consists of the secondary winding 40 connected in series with all of the turns of the reactor winding 42 and a selected portion of the turns of the reactor winding 44 depending on the welding current requirement. Also if winding 40 is used, the welding instrument is connected between the receptacle 72a which is the low ground connection, and a selected one of the receptacles 56a–70a.

The reactor windings 42 and 44 are mounted on the opposite leg 28 of the core 20 from the transformer windings 36, 38 and 40 and only a limited amount of direct transfer of energy takes place under load conditions between the reactor windings and transformer windings. It is important as will be explained hereinafter that some direct transfer take place even though basically the reactor windings 42 and 44 act predominantly as impedance devices to provide the desired output current increments.

For a more complete understanding of the theory of operation, one operating condition will be discussed in detail. In discussing the selected operating condition, it will be assumed that the primary winding 36 of the transformer 35 is connected to a suitable source of alternating current, that the high ground receptacle 52a on the control panel 15 is connected to one side of an arc welding device, and that the receptacle 56a is connected to the other side of the welding device. With this connection a secondary voltage is induced across the secondary winding 38 by the primary 36 and a voltage is also induced in the upper series connected portion of reactor winding 42, which is the only portion of the reactor winding connected in the circuit.

With the secondary circuit open (FIG. 6) a relatively large voltage which is proportional to the turns ratio between primary and reactor winding appears across the reactor winding 42 and this voltage adds to the voltage across the secondary winding 38 to produce an output voltage across the series combination of said windings equal to the mathematical sum of said secondary and reactor voltages. In the graph (FIG. 6) it can be seen that the open circuit voltage across the series combination, with an input voltage of 230 volts, using receptacles 56a and 52a, is approximately equal to 50 volts, the numerical sum of 30 volts across the secondary winding 38 and 20 volts across the series connected portion of the reactor winding 42. This relatively high output voltage is desirable from the standpoint of providing desirable arc starting characteristics, as will be shown, but only a portion of this voltage is necessary for welding.

When a load is applied to the secondary circuit as by welding, the voltage across the secondary winding 38 remains substantially unchanged because of the relatively close coupling between it and the primary winding 36. However, the voltage across the reactor winding partially collapses because of the relatively loose coupling between it and the primary winding 36. Also at relatively large loads when only a small portion of the total reactor turns are used, there will be less voltage across the reactor winding than at smaller loads, and hence less reactance in the secondary circuit to produce phase shift between the secondary current and the secondary voltage. Therefore, when the load is large and the phase shift small the power factor is also relatively high.

In FIG. 7 a graph is shown which illustrates vectorially the relative magnitude and phase relationship of the secondary voltage components which combine to make the output voltage, namely the secondary transformer voltage and the reactor voltage. In making this graph the output voltage was held constant at 25 volts because 25 volts is a good average output voltage over the full range of the device. From the graph it is seen that the secondary voltage vector remains relatively constant with changes in load, and the reactor voltage vector varies substantially both in magnitude and phase, and furthermore the reactor voltage vector has a component which opposes and reduces the transformer secondary voltage. This component of reactor voltage which opposes and reduces the power in secondary circuit is in phase with the input voltage and has a desirable controlling effect on the output voltage. It should also be noted in FIG. 7 that the reactive component of the reactor voltage is at minimum when the load is at maximum, and therefore the phase displacement of the output voltage relative to the secondary current is at minimum when the output is maximum. This means that the power factor is greatest when the load is greatest. As the load is decreased the reactive component of the secondary circuit increases and the component of reactor voltage which opposes the secondary voltage becomes larger thereby having a greater opposing effect on the transformer secondary voltage. The increase in reactance which occurs when the load is decreased lowers the power factor somewhat but this is not a particular disadvantage at the reduced load conditions. Furthermore, as the load is decreased the component of reactor voltage which opposes the transformer secondary voltage places a minimum limit on the magnitude of the output. This also is not a disadvantage because it is not practical to weld with currents in the ranges that are affected by this limitation.

The direct transfer of energy from the primary winding 36 to the reactor winding also has another effect upon the output which comes about because of the inherent characteristic of reactors, namely the characteristic that causes their impedances to vary inversely as a function of the voltage across them. For example, if a large voltage is applied across a reactor the impedance thereof will be less than if a small voltage is applied thereacross. In the present device, as pointed out above, less voltage is across the used portion of the reactor winding under load conditions than under open circuit conditions. Therefore, under load the impedance of the reactors is increased which tends to reduce the load current and increase the output voltage. The increase in output voltage produced by this action is not as large as the decrease in output voltage produced by the partial collapse of the reactor field under load, but nevertheless has the effect of tending to increase the output voltage and therefore improves and stabilizes the voltage at the welding instrument.

Under actual operating conditions it has been found that approximately 13% of the total output in the secondary circuit is effected by the direct transfer of energy from the primary winding to the reactor winding. The amount of direct transfer changes with load and also with the spacing between the core legs and the size and distribution of the different windings. However, as already noted the direct transfer has desirable controlling effects on the device. If the spacing of the legs is decreased, for example, the direct transfer increases, and conversely if the spacing is increased the direct transfer decreases. Furthermore, the direct transfer of energy between the primary and the reactor winding becomes more important and has greater effect when the load current is relatively small for the reason that under these conditions there are more reactor winding turns in the circut, and hence a greater amount of direct transfer takes place. In fact, the effect of the direct transfer becomes so large relative to the total output at very small loads that it actually places a limit on the lowest possible load current available. In actual practice a direct transfer of approximately 13% at full load gives a very satisfactory operation condition for the full range of the device. In actual tests very good arc starting characteristics have been experienced even when using welding rods as large as ¼ inch and bigger. Furthermore, the improved arc starting characteristics of the present device are available at all loads within the range of the device.

Another factor which effects the direct transfer, in addition to the spacing of the core legs, is the fact that a single closed core element is used.

FIG. 4 shows the details of construction of the core 20 per se used in the present device. The particular core shown is formed of two different size lamination strips arranged in staggered layers as shown. The longer lamination strips 26a and 28a form the vertical legs 26 and 28 of the core, and the shorter strips 22a and 24a form the upper and lower cross-over legs 22 and 24 of the core. The staggered arrangement of the core strips minimizes core losses and core heat, and provides a desirable operating condition. The core dimensions are selected to provide approximately 13% direct transfer between primary and reactor windings at full load.

One particular embodiment of a device is shown in the drawings and described herein to illustrate the present invention. It is not intended, however, that the invention is to be limited to the particular embodiment shown, and it is apparent that many changes, modifications and alterations could be made without departing from the spirit and scope of the invention. Furthermore, the locations and type of connections used particularly on the reactor windings 42 and 44 can be changed to provide any desired load increments, and it is contemplated to design and construct the device by trial and error techniques or by mathematical or theoretical calculations.

The welding currents available from the present device are extremely accurate and reliable over the full range, and the device operates efficiently and at a relatively high power factor. The power factor under actual test has been found to be in the neighborhood of 82% or better at full load, and this condition is obtained without the use of any auxiliary phase correcting devices such as capacitors, resistors, inductors and the like.

To the left in FIG. 3 a typical actual heat range chart is shown in which welding currents are indicated for each of the receptacle positions on the control panel 15. In the extreme left-hand column the current increments correspond to the high ground connection using the secondary winding 38, and in the right-hand column the current increments correspond to the low ground connections using the secondary winding 40.

In FIG. 1 there is also shown a power input lead 74 with a plug receptacle 76 attached to the end thereof. The receptacle 76 is plugged into a suitable electrical outlet and feeds power to the device 10. Also shown in FIG. 1 are two outlet leads 78 and 80 with plug in end connectors 82 and 84 respectively which are selectively plugged into the receptacles 52a, 72a and 56a–70a depending upon the welding current required. In the drawings the plug 84 is shown plugged into receptacle 56a and the plug 82 is shown plugged into the low ground receptacles 72a. The outlet leads 78 and 80 have alligator clips 86 and 88 respectively connected to the opposite ends thereof for attaching to a suitable welding instrument or other controlled device.

It is now apparent that there has been shown and provided a control device which fulfills all of the objects and advantages sought therefor. Obviously, many changes, alterations and modifications of the present device could be made by those skilled in the art without departing from the spirit and scope thereof. All such changes, alterations and modifications which do not depart from the spirit and scope are deemed to be covered by the present invention which is limited only by the claims which follow.

What is claimed is:

1. An electric control device comprising a closed magnetizable core member defined by spaced and connected leg elements, a pair of transformer windings mounted on one of said spaced leg elements and a third winding having predominantly reactive characteristics mounted on the other of said pair of leg elements, means connecting an alternating current source to one of the transformer windings whereby said winding establishes a magnetic field that induces a voltage in the other of said pair of transformer windings and in said third winding, means connecting a series circuit including only said other transformer winding and a selected portion of said third winding across a welding device, the turns of the windings of said other transformer winding and said third winding being wound on said associated core leg elements so as to have out-of-phase voltage components induced therein.

2. An electric control for an arc welding device comprising a single magnetizable core member defined by two spaced and connected leg elements, said core member forming an uninterrupted magnetic path, a pair of transformer windings mounted on one of said pair of spaced leg elements and a third winding having predominantly reactive characteristics mounted on the other of said pair of leg elements, means connecting one of the transformer windings across an alternating current source whereby said winding establishes a magnetic field and induces a voltage in said other of said pair of transformer windings and in said third winding, said other of said pair of transformer windings and said third winding being wound on said core member so that the voltages induced therein have out-of-phase components which partially neutralize each other, and means connecting only said other of said pair of transformer windings and a selected portion of said third winding in series across an arc welding device.

3. The electric control device defined in claim 1 wherein said other of said pair of transformer windings includes at least two separate winding portions each having a different number of turns, and means connecting one of said separate winding portions and a selected portion of the third winding in series across a device to be controlled.

References Cited in the file of this patent
UNITED STATES PATENTS

| | | |
|---|---|---|
| 1,810,251 | Musto | June 16, 1931 |
| 1,994,953 | Klinkhamer | Mar. 19, 1935 |
| 2,086,316 | Holslag | July 6, 1937 |
| 2,175,927 | Steinert | Oct. 10, 1939 |
| 2,206,856 | Shearer | July 2, 1940 |
| 2,322,709 | Owen | June 22, 1943 |
| 2,464,679 | Fletcher | Mar. 15, 1949 |
| 2,753,513 | Sola | July 3, 1956 |
| 2,873,356 | Carroll | Feb. 10, 1959 |
| 2,931,967 | Mills | Apr. 5, 1960 |